(12) United States Patent
Zhang et al.

(10) Patent No.: US 8,605,908 B2
(45) Date of Patent: Dec. 10, 2013

(54) METHOD AND DEVICE FOR OBTAINING SECURITY KEY IN RELAY SYSTEM

(75) Inventors: Dongmei Zhang, Beijing (CN); Xiaoyu Bi, Beijing (CN); Aiqin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/463,444

(22) Filed: May 3, 2012

(65) Prior Publication Data

US 2012/0213372 A1    Aug. 23, 2012

Related U.S. Application Data

(63) Continuation of application No. PCT/CN2010/078367, filed on Nov. 3, 2010.

(30) Foreign Application Priority Data

Nov. 3, 2009   (CN) .......................... 2009 1 0110027

(51) Int. Cl.
    *H04L 9/08*    (2006.01)
(52) U.S. Cl.
    USPC .......................................................... 380/278
(58) Field of Classification Search
    USPC .................................. 380/277–278; 713/171
    See application file for complete search history.

(56) References Cited

U.S. PATENT DOCUMENTS

| 8,132,234 | B2 | 3/2012 | Yao |
| 2008/0046732 | A1 | 2/2008 | Fu et al. |
| 2008/0107013 | A1 | 5/2008 | Boariu et al. |
| 2008/0184032 | A1* | 7/2008 | Li et al. .......................... 713/171 |
| 2009/0074189 | A1 | 3/2009 | Ryu et al. |

FOREIGN PATENT DOCUMENTS

| CN | 101166132 A | 4/2008 |
| CN | 101292558 A | 10/2008 |
| CN | 101437226 A | 5/2009 |
| CN | 101534236 A | 9/2009 |
| CN | 101815293 A | 8/2010 |
| EP | 1914960 A1 | 4/2008 |

OTHER PUBLICATIONS

Extended European Search Report issued in corresponding European Patent Application No. 10827902.7, mailed Aug. 10, 2012.

(Continued)

*Primary Examiner* — Brandon Hoffman
*Assistant Examiner* — Anthony Brown
(74) *Attorney, Agent, or Firm* — Brinks Gilson & Lione

(57) ABSTRACT

A method and a device for obtaining a security key in a relay system are disclosed in the embodiment of the present invention. A node in the relay system obtains an initial key, according to the initial key, the node obtains a root key of an air interface protection key between the node and another node that is directly adjacent to the node, and according to the root key, the node obtains the air interface protection key between the node and said another node that is directly adjacent to the node. Therefore, according to the initial key, each lower-level node obtains a root key of an air interface protection key between each lower-level node, so that data of a UE on a Un interface link may be respectively protected, that is, each active UE has a set of security parameters on the Un interface link, and effective security protection is performed on data on each segment of an air interface.

11 Claims, 8 Drawing Sheets

---

101: A node in a relay system obtains an initial key

102: According to the initial key, the node obtains a root key of an air interface protection key between the node and another node that is directly adjacent to the node 103: According to the root key, the node obtains the air interface protection key between the node and said another node that is directly adjacent to the node

(56) References Cited

OTHER PUBLICATIONS

LTE, "Digital Cellular Telecommunications System (Phase 2+); Universal Mobile Telecommunications System (UMTS); LTE; 3GPP System Architecture Evolution (SAE); Security Architecture" (3GPP TS 33.401 version 8.4.0 Release 8) ETSI TS 133 401, Jul. 2009.

LTE, "3$^{rd}$ Generation Partnership Project; Technical Specification Group Radio Access Network; Evolved Universal Terrestrial Radio Access (E-UTRA); Relay Architectures for E-UTRA (LTE-Advanced)" (Release 9) 3GPP TR 36.806 V0.1.1, Nov. 2009.

International Search Report and Written Opinion of the International Searching Authority issued in corresponding PCT Patent Application No. PCT/CN2010/078367, mailed Feb. 10, 2011.

LTE, "3$^{rd}$ Generation Partnership Project; Technical Specification Group Services and System Aspects; 3GPP System Architecture Evolution (SAE): Security Architecture" (Release 9) 3GPP TS 33.401. v9.1.0, Sep. 2009.

Office Action (including partial English Translation) issued in corresponding Chinese Patent Application No. 200910110027.5; mailed Jan. 14, 2013.

Office Action issued in corresponding Chinese Patent Application No. 200910110027.5, mailed Jul. 4, 2013, 7 pages.

Office Action issued in corresponding Russian Patent Application No. 2012122772/08, mailed Aug. 7, 2013, 11 pages.

* cited by examiner

901: A first relay node obtains a root key in a process of authentication with an adjacent node of the first relay node 902: According to the root key, the first relay node obtains an air interface protection key for performing protection between the first relay node and the adjacent node. The adjacent node of the first relay node includes an upper-level node of the first relay node and/or a lower-level node of the first relay node.

FIG. 9

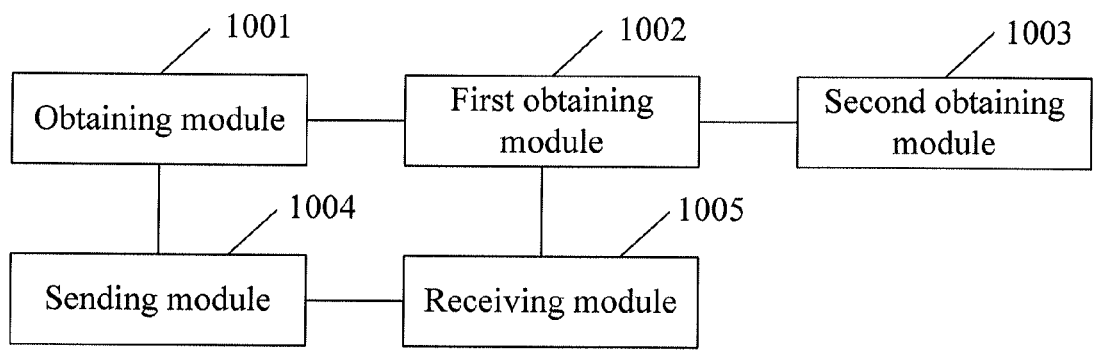

FIG. 10

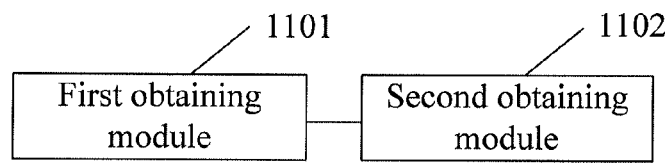

FIG. 11

METHOD AND DEVICE FOR OBTAINING SECURITY KEY IN RELAY SYSTEM

CROSS-REFERENCE TO RELATED APPLICATIONS

This application is a continuation of International Application No. PCT/CN2010/078367, filed on Nov. 3, 2010, which claims priority to Chinese Patent Application No. 200910110027.5, filed on Nov. 3, 2009, both of which are hereby incorporated by reference in their entireties.

FIELD OF THE INVENTION

The present invention relates to the field of communication technologies, and in particular, to a method and a device for obtaining a system key in a relay system.

BACKGROUND OF THE INVENTION

LTE-A (Long Term Evolution-Advanced, LTE-Advanced) is the advancement of a broadband radio communication technology standard 3GPP LTE which is closely concerned currently. In order to improve a throughput at an edge of a cell, a relay node (Relay Node, RN) is introduced into the LTE-A, so as to facilitate temporary network deployment demands for operators or users, and support a group movement function, where the RN may be deployed at rural, urban, and an indoor hot spot region or a blind spot region.

The RN is located between a Donor eNB (DeNB, Donor eNB) to which the RN belongs and a UE, the RN sends a downlink signal to the UE, or sends an uplink signal to the DeNB, where an air interface between the RN and the DeNB is called a Un interface, and an air interface between the RN and the UE is called a Uu interface. Data from the DeNB to the UE passes through two segments of air interfaces, that is, the data reaches the UE through two hops. As more RNs are added, a multi-hop scenario may also occur in the LTE-A.

Due to the introduction of the RN, the segment number of air interface links is increased, a key level is also increased, and an existing security mechanism is incapable of performing effective security protection on data on each segment of an air interface.

SUMMARY OF THE INVENTION

The embodiments of the present invention provide a method and a device for obtaining a security key in a relay system, so as to respectively protect data of a UE on a Un interface link.

An embodiment of the present invention discloses a method for obtaining a security key in a relay system, which includes:

obtaining, by a node in the relay system, an initial key;

according to the initial key, obtaining, by the node, a root key of an air interface protection key between the node and another node that is directly adjacent to the node; and according to the root key, obtaining, by the node, the air interface protection key between the node and said another node that is directly adjacent to the node.

An embodiment of the present invention discloses a method for obtaining a security key in a relay system, which includes:

obtaining, by a first relay node, a root key, in a process of an authentication with a node that is adjacent to the first relay node; and according to the root key, obtaining, by the first relay node, an air interface protection key for performing protection between the first relay node and the adjacent node, where the adjacent node of the first relay node includes an upper-level node of the first relay node and/or a lower-level node of the first relay node.

an eNB includes:

an obtaining module, configured to obtain an initial key by a node in a relay system;

a first obtaining module, configured to, according to the initial key obtained by the obtaining module, obtain a root key of an air interface protection key between the node and another node that is directly adjacent to the node; and a second obtaining module, configured to, according to the root key obtained by the first obtaining module, obtain the air interface protection key between the node and said another node that is directly adjacent to the node.

a relay node includes:

a first obtaining module, configured to: a first relay node obtains a root key in a process of an authentication with an adjacent node of the first relay node; and a second obtaining module, configured to: the first relay node obtains, according to the root key obtained by the first obtaining module, an air interface protection key for performing protection between the first relay node and the adjacent node, where the adjacent node of the first relay node includes an upper-level node of the first relay node and/or a lower-level node of the first relay node.

In the embodiments of the present invention, a node in a relay system receives an initial key, according to the initial key, obtains a root key of an air interface protection key between the node and another node that is directly adjacent to the node, and according to the root key, obtains the air interface protection key between the node and said another node that is directly adjacent to the node, so that data of a UE on a Un interface link may be respectively protected, that is, each active UE has a set of security parameters on the Un interface link, and furthermore, effective security protection is performed on data on each segment of an air interface.

BRIEF DESCRIPTION OF THE DRAWINGS

To describe the technical solutions in the embodiments of the present invention or in the prior art more clearly, the accompanying drawings required for describing the embodiments are introduced briefly in the following. Apparently, the accompanying drawings in the following description are only some embodiments of the present invention, and persons of ordinary skill in the art may also derive other drawings from these accompanying drawings without creative efforts.

FIG. 9 is a flow chart of a method for obtaining a security key in a relay system according to a ninth embodiment of the present invention;

FIG. 10 is a schematic structural diagram of a node in a relay system according to an embodiment of the present invention; and FIG. 11 is a schematic structural diagram of another node in a relay system according to an embodiment of the present invention.

DETAILED DESCRIPTION OF THE EMBODIMENTS

Figure 1:
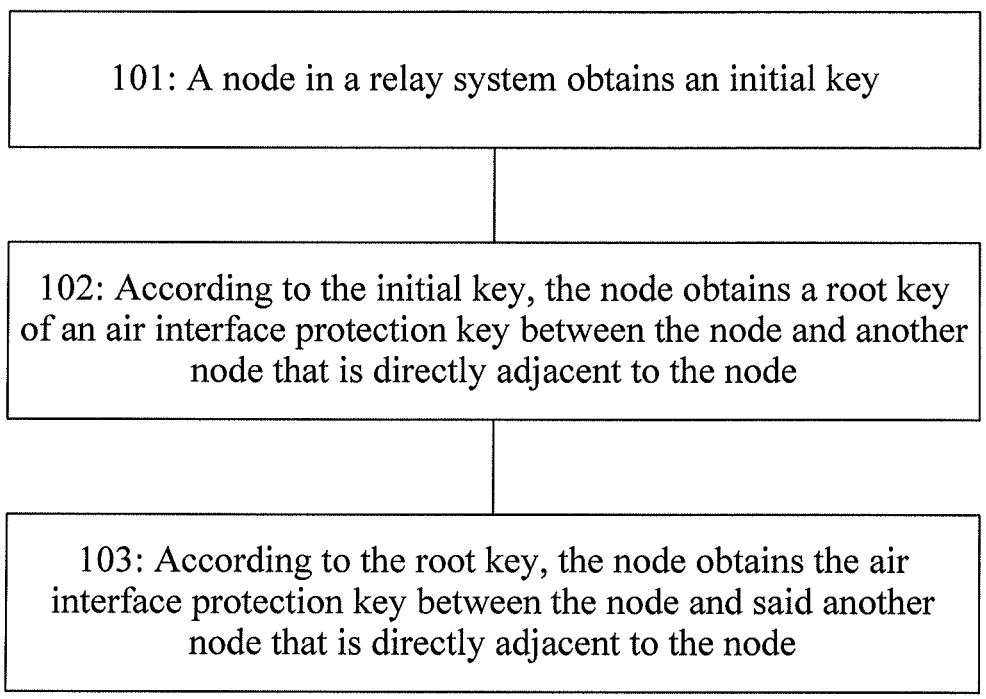
FIG. 1 is a flow chart of a method for obtaining a security key in a relay system according to a first embodiment of the present invention.

In order to make the objectives, technical solutions, and advantages of the present invention clearer, the present invention is clearly and fully described in the following with reference to the accompanying drawings. Apparently, the embodiments to be described are only a part rather than all of the embodiments of the present invention. Based on the embodiments of the present invention, all other embodiments obtained by persons skilled in the art without creative efforts shall fall within the protection scope of the present invention.

An RN has the following characteristics.

The RN may have a physical cell identity (PCI, Physical Cell Identity) of its own, which is used to transmit a synchronization signal and a reference signal of the RN A UE may receive scheduling information and a feedback of a hybrid automatic retransmitting request (HARQ, Hybrid Automatic Retransmitting Request) from the RN, and send control information of the UE to the RN.

For a 3GPP Release 8 UE, the RN may be an R8 eNB, that is, the RN has a backward compatibility characteristic.

For an LTE-A UE, the RN may be an entity that is different from the R8 eNB.

In an authentication process of an LTE system, a home subscriber server (HSS, Home Subscriber Server) generates an original encryption root key and an original integrity protection root key, that is, CK,IK, according to a local original root key K. In the authentication process, the HSS obtains an initial key $K_{ASME}$ of a core network according to the CK,IK, and sends the $K_{ASME}$ to an MME. The MME obtains a non-access stratum (NAS, Non-Access Stratum) key $K_{NAS}$ and an initial key $K_{eNB}$ of an access network according to the $K_{ASME}$, and the MME sends the $K_{eNB}$ to an eNB, and the eNB locally obtains an access stratum (AS, access stratum) key $K_{AS}$ according to the $K_{eNB}$ where the $K_{NAS}$ includes an NAS message encryption key and an NAS message integrity protection key, and the $K_{AS}$ includes an encryption key of a user plane UP (User Plane, user plane), an integrity protection key of a control plane CP (Control Plane, control plane), and an encryption key of the CP. A UE side may also generate the CK, IK according to the local original root key K. The UE obtains the $K_{ASME}$ according to the CK, IK, the UE obtains the NAS key $K_{NAS}$ and the $K_{eNB}$ according to the $K_{ASME}$, and the UE obtains the AS key $K_{AS}$ according to the $K_{eNB}$. A method for obtaining a key used by the MME and the UE is as follows.

A key derivation function (KDF), that is, KDF, includes:
A derived key=HMAC-SHA-256 (Key, S).
The Key is an input key, S=FC||P0||L0||P1||L1 . . . ;
The length of the FC is one byte, and is used for distinguishing different algorithms, the P0 is an input parameter, and the L0 is a length of the P0.
The obtaining method is as follows:

$$K_{ASME}=KDF(CK||IK,S10),S10=f(FC,PLMN\ ID,SQN\ AK).$$

The MME and the UE locally obtain:

$$K_{eNB}=KDF(K_{ASME},S11),S11=f(\text{Uplink NAS COUNT});$$

$$K_{NAS}=KDF(K_{ASME},S15),S15=f(\text{algorithm type distinguisher,algorithm id});$$

The eNB and the UE locally obtain:

$$K_{AS}=KDF(K_{eNB},S15).$$

$$S10=f(FC,PLMN\ ID,SQN\ AK)=FC||PLMN\ ID||\text{length of }PLMN\ ID||SQN\ AK||\text{length of}(SQN\ AK);$$

where FC=0x10, and the PLMN ID refers to a public land mobile network identity. The SQN is a sequence number, AK may be an anonymous key, and the length of xx may be a length of XX.

S11=f (FC, Uplink NAS COUNT)=FC||Uplink NAS COUNT||length of Uplink NAS COUNT;

where FC=0X11, and Uplink NAS COUNT may be an uplink NAS message count value.

S15=f (FC, algorithm type distinguisher, algorithm id)=FC||algorithm type distinguisher||length of algorithm type distinguisher||algorithm id||length of algorithm id;

where FC=0X15, algorithm type distinguisher may be an algorithm type distinguishing number, and algorithm id may be an algorithm identity number.

However, due to the introduction of the RN, the segment number of air interface links is increased, a key level is also increased, and an existing security mechanism is incapable of performing effective security protection on data on each segment of an air interface. In order to solve the technical problem, an embodiment of the present invention provides a method for obtaining a key in a multi-hop system, where a specific situation is as follows.

The embodiments of the present invention in the following are described in detail by taking a 3-hop system as an example, and a method in each embodiment is also applicable to a 2-hop system or a system that has more than 2 hops.

FIG. 1 is a flow chart of a method for obtaining a security key in a relay system according to a first embodiment of the present invention. The method includes:

Step 101: A node in the relay system obtains an initial key.

Step 102: According to the initial key, the node obtains a root key of an air interface protection key between the node and another node that is directly adjacent to the node.

Step 103: According to the root key, the node obtains the air interface protection key between the node and said another node that is directly adjacent to the node.

In this embodiment of the present invention, the node in the relay system obtains the initial key, according to the initial key, the node obtains the root key of the air interface protection key between the node and said another node directly that is adjacent to the node, and according to the root key, the node obtains the air interface protection key between the node and said another node that is directly adjacent to the node, so that data of a UE on a Un interface link may be respectively protected, that is, each active UE has a set of security parameters on the Un interface link, and furthermore, effective security protection is performed on data on each segment of an air interface.

Furthermore, when the node in the relay system is an eNB, the obtaining, by the node in the relay system, the initial key includes:

The eNB obtains the initial key from a mobility management entity MME.

Furthermore, when the node in the relay system is a relay node RN, the obtaining, by the node in the relay system, the initial key includes:

The RN obtains the initial key from the MME or the eNB.

Furthermore, when the node in the relay system is a user equipment UE, the obtaining, by the node in the relay system, the initial key includes:

The UE obtains the initial key from an upper-level node of the UE.

Furthermore, when the node in the relay system is the eNB, the method further includes:

The eNB obtains an initial key of a lower-level node of the eNB according to a transfer input parameter and the initial key.

The eNB sends the initial key to one of lower-level nodes of the node.

The eNB sends the transfer input parameter to a node that is directly adjacent to one of the lower-level nodes of the node, so that according to the transfer input parameter and the initial key, one of the lower-level nodes of the node and the node that is directly adjacent to one of the lower-level nodes of the node obtain a root key of an air interface protection key between one of the lower-level nodes of the node and the node that is directly adjacent to one of the lower-level nodes of the node.

Furthermore, when the node in the relay system is the relay node RN, the method further includes:

The RN receives the transfer input parameter that is sent by the upper-level node.

According to the initial key, the node obtains the root key of the air interface protection key between the node and the node that is directly adjacent to the node, which specifically includes:

According to the initial key and the transfer input parameter, the relay node RN obtains the root key of the air interface protection key between the node and the node that is directly adjacent to the node.

Furthermore, when the node in the relay system is the relay node UE, the method further includes:

The UE receives the transfer input parameter that is sent by the upper-level node.

According to the initial key, the node obtains the root key of the air interface protection key between the node and the node that is directly adjacent to the node, which specifically includes:

According to the initial key and the transfer input parameter, the UE obtains the root key of the air interface protection key between the node and the node that is directly adjacent to the node.

It is specifically noted that the input parameter in this embodiment may be the transfer input parameter.

In this embodiment of the present invention, the node in the relay system obtains the initial key, according to the initial key, the node obtains the root key of the air interface protection key between the node and said another node that is directly adjacent to the node, and according to the root key, the node obtains the air interface protection key between the node and said another node that is directly adjacent to the node, so that data of a UE on a Un interface link may be respectively protected, that is, each active UE has a set of security parameters on the Un interface link, and furthermore, effective security protection is performed on data on each segment of an air interface.

Figure 2:
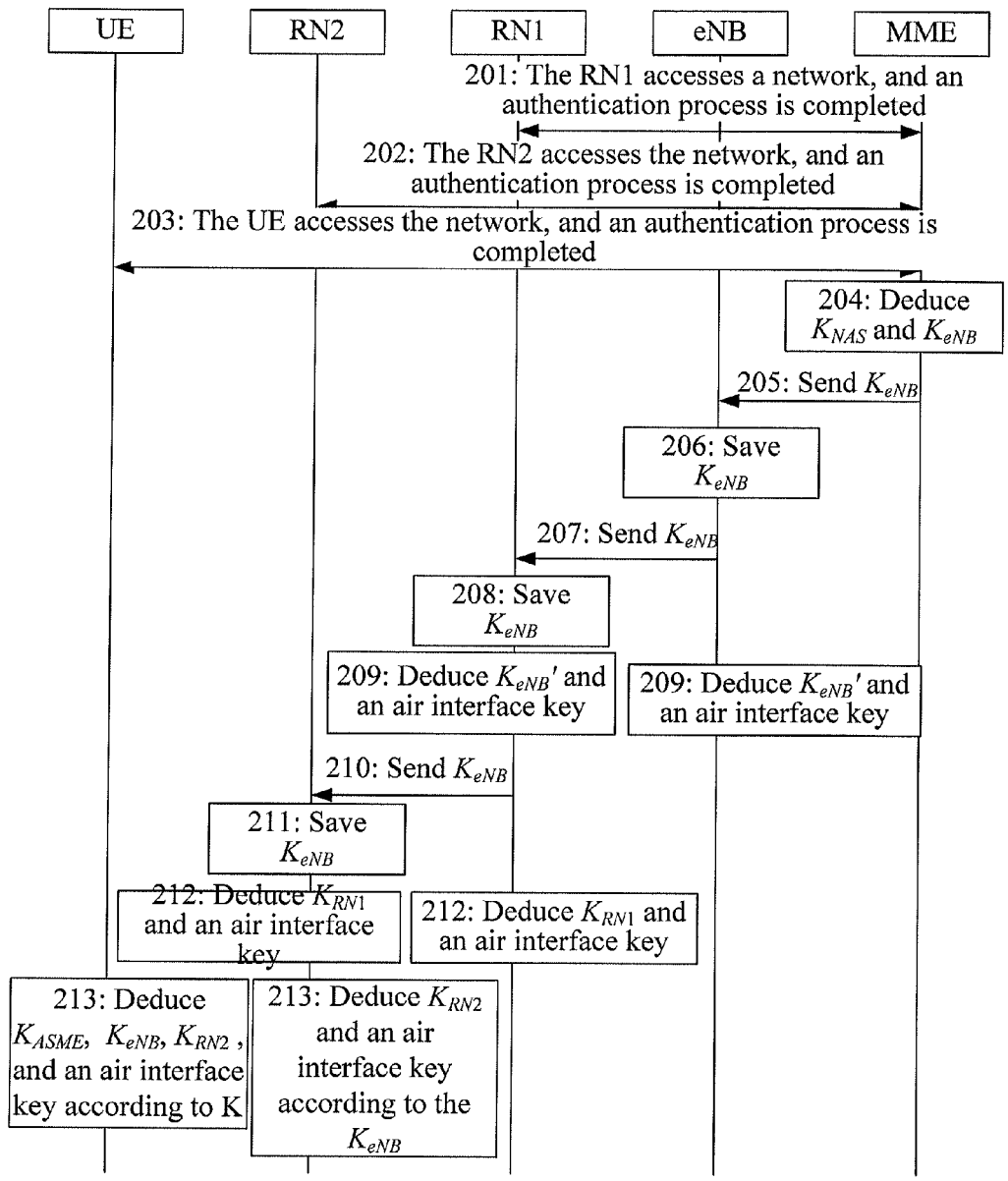
FIG. 2 is a flow chart of a method for obtaining a security key in a relay system according to a second embodiment of the present invention.

FIG. 2 is a flow chart of a method for obtaining a security key in a relay system according to a second of the present invention. In this embodiment, a UE obtains all air interface keys according to a local original root key K of the UE, $K_{eNB}$ is transferred from an upper-level node eNB or RN to a lower-level RN through an air interface, an input parameter in this embodiment may be a local input parameter. As shown in FIG. 2:

Step 201: An RN1 accesses a network, and an authentication process is completed.

Step 202: An RN2 accesses the network, and an authentication process is completed.

Step 203: A UE accesses the network, and an authentication process is completed.

There is no precedence order among steps 201, 202, and 203.

Step 204: An MME obtains $K_{NAS}$ and an initial key $K_{eNB}$ according to a key $K_{ASME}'$ that is generated in the authentication process of the UE.

In step 204, the method for obtaining the $K_{NAS}$ and the initial key $K_{eNB}$ is similar to a method for obtaining a key in an LTE system, which is not described in detail here.

Step 205: The MME sends the initial key $K_{eNB}$ to the eNB.

Step 206: The eNB receives and saves the initial key $K_{eNB}$ that is sent by the MME.

Step 207: The eNB forwards the initial key $K_{eNB}$ to the RN1.

Step 208: The RN1 saves the initial key $K_{eNB}$.

Step 209: The eNB and the RN1 locally obtain a root key $K_{eNB}'$ between the eNB and the RN1 according to the initial key $K_{eNB}$, and according to the root key $K_{eNB}'$, obtain air interface keys used for protecting UP data and CP data between the eNB and the RN1, and a specific method is as follows:

$$K_{eNB}'=KDF(K_{eNB}, f(\text{a first input parameter})).$$

When the RN1 accesses the network, the first input parameter may be a temporary identity parameter C-RNTI1 that is allocated by the eNB to the RN1, where it should be particularly noted that each time when the RN1 re-accesses a new DeNB, the obtained C-RNTI1 is different; or the first input parameter may be a radio resource control (RRC) message count value parameter RRC MESSAGE COUNT1 of a specific UE between the eNB and the RN1; or the first input parameter may be a random value parameter NONCE1 that is negotiated by the eNB with the RN1, and the input parameter may include, but is not limited to, one or any combination of the preceding three types of parameters.

The keys used for protecting the UP data and the CP data between the eNB and the RN1 are obtained according to the root key $K_{eNB}'$, where a UP data protection key is a UP encryption key $K_{UPenc}$, CP data protection keys are a CP encryption key $K_{RRCenc}$ and a CP integrity protection key $K_{RRCi\ int}$, the method for obtaining the three keys is made reference to the formula for obtaining $K_{AS}$, an input key is $K_{eNB}'$, and in the following, obtaining of the key $K_{UPenc}$ is taken as an example for description, that is:

$$K_{UPenc}=KDF(K_{eNB}', f(\text{UP encryption algorithm type distinguisher, UP encryption algorithm id})),$$

where the UP encryption algorithm type distinguisher is a distinguisher for a UP encryption algorithm type, and the UP encryption algorithm id is an ID of a UP encryption algorithm.

Step 210: The RN1 forwards the initial key $K_{eNB}$ to the RN2.

Step 211: The RN2 saves the initial key $K_{eNB}$.

Step 212: The RN1 and the RN2 obtain a root key $K_{RN1}$ according to the initial key $K_{eNB}$, where an obtaining method is:

$$K_{RN1}=KDF(K_{eNB}, f(\text{a second input parameter})),$$

where when the RN2 accesses the network, the second input parameter may be a temporary identity parameter C-RNTI2 that is allocated by the RN1 to the RN2; or the second input parameter may be an RRC message count value parameter RRC MESSAGE COUNT2 that is related to a specific UE between the RN1 and the RN2; or the second input parameter may be a random value parameter NONCE2 that is negotiated by the RN1 with the RN2. The input parameter may include, but is not limited to one or any combination of the preceding three types of parameters.

The method for obtaining the UP data protection key $K_{UPenc}'$ and the CP data protection keys $K_{RRCenc}'$ and $K_{RRCi\,int}'$ on a Un interface link between the RN1 and the RN2 according to the root key $K_{RN1}$ is similar to the method for obtaining $K_{AS}$ in the LTE system, which is not described in detail here.

Step 213: The UE locally obtains $K_{NAS}$ and the initial key $K_{eNB}$, an obtaining method is similar to that in the prior art, and is not described in detail here. The RN2 and the UE obtain a root key $K_{RN2}$ according to the initial key $K_{eNB}$, and obtain an air interface key used for protecting UP data and CP data between the UE and the RN2 according to the root key $K_{RN2}$, and A method for obtaining the $K_{RN2}$ may include the following two manners.

a. $K_{RN2}=KDF(K_{eNB}, f(\text{a third input parameter}))$, where the input key is $K_{eNB}$, and when the UE accesses the network, the third input parameter may be a temporary identity parameter C-RNTI3 that is allocated by the RN2 to the UE; or the third input parameter may be an RRC message count value parameter RRC MESSAGE COUNT3 that is related to a specific UE between the RN2 and the UE; or the third input parameter may be a random value parameter NONCE3 that is negotiated by the RN2 with the UE, where the input parameter may include, but is not limited to, one or any combination of the preceding three types of parameters.

b. The $K_{eNB}$ is updated by adopting an intra-cell handover manner, so as to obtain the root key $K_{RN2}$, specifically:

$$K_{RN2}=KDF(K_{eNB}, f(PCI, EARFCN\text{-}DL)),$$

where the input key is the key $K_{eNB}$ that is used before handover, the input parameters may be a target cell PCI and a target cell radio frequency channel number EARFCN-DL.

In this embodiment of the present invention, the eNB receives the initial key $K_{eNB}$, obtains the root key $K_{eNB}'$ between the eNB and the RN1 node according to the initial key $K_{eNB}$, according to the root key $K_{eNB}'$, obtains the air interface protection key between the eNB and a directly lower-level node of the eNB, and forwards the initial key $K_{eNB}$, so that each lower-level node obtains a root key of an air interface protection key between each lower-level node according to the initial key $K_{eNB}$, and data of the UE on a Un interface link may be respectively protected, that is, each active UE has a set of security parameters on the Un interface link, and furthermore, effective security protection is performed on data on each segment of an air interface.

Figure 3:
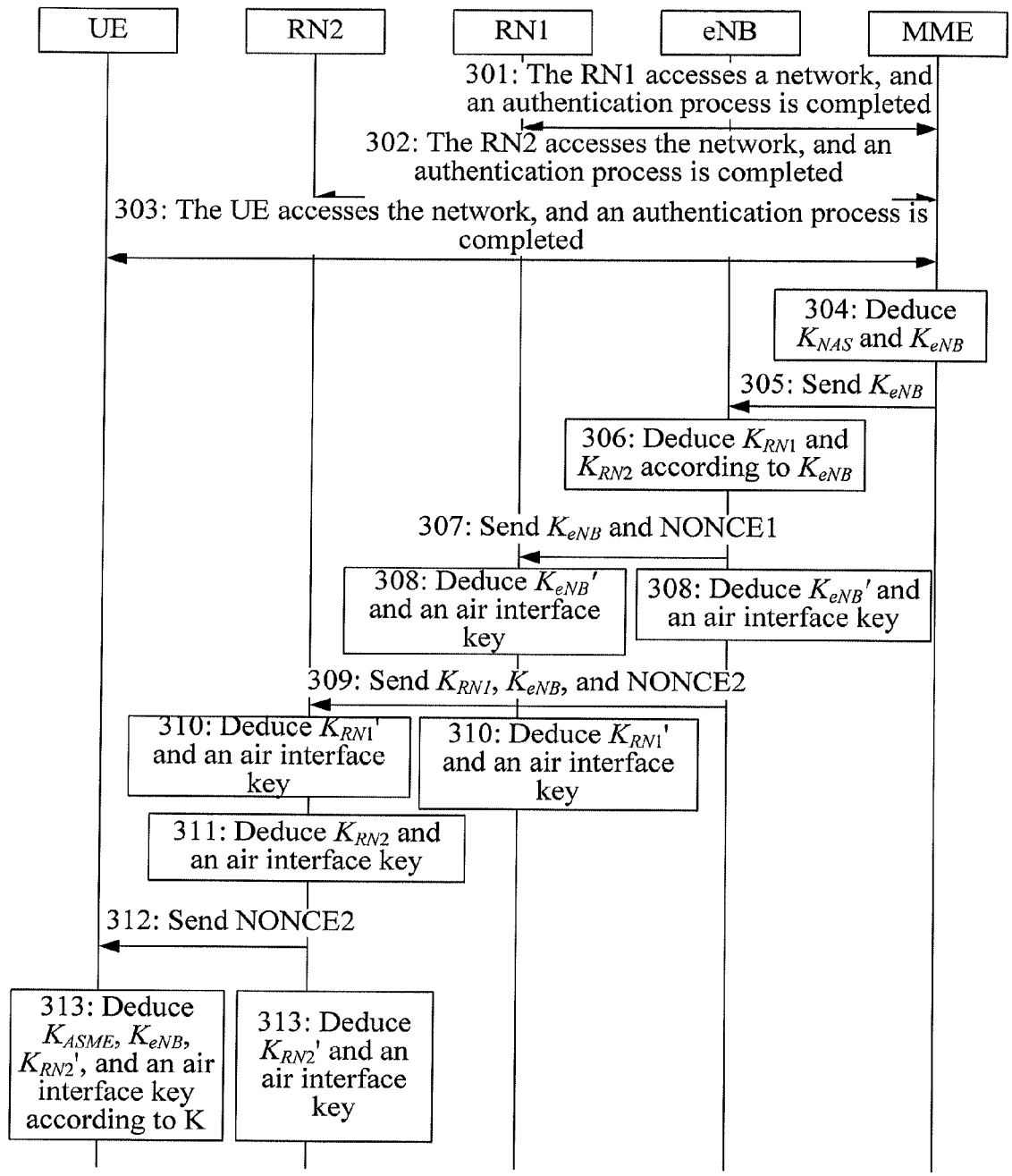
FIG. 3 is a flow chart of a method for obtaining a security key in a relay system according to a third embodiment of the present invention.

FIG. 3 is a flow chart of a method for obtaining a security key in a relay system according to a third embodiment of the present invention. In this embodiment, a difference from the second embodiment is that an eNB locally obtains initial keys of all lower-level RNs according to a received $K_{eNB}$, then delivers obtained results or obtained parameters to each-level node, where input parameters in this embodiment may include a transfer input parameter and a local input parameter. As shown in FIG. 3:

Steps 301 to 305 are similar to steps 201 to 205 in the second embodiment, and are not described in detail here.

Step 306: The eNB locally obtains initial keys $K_{RN1}$, and $K_{RN2}$ of each lower-level node according to a received initial key $K_{eNB}$ and an obtaining method is as follows:

$$K_{RN1}=KDF(K_{eNB}, f(\text{a fourth input parameter}))$$

$$K_{RN2}=KDF(K_{eNB}, f(\text{a fifth input parameter})).$$

The fourth input parameter may be a transfer input parameter, and when an RN2 accesses a network, the fourth transfer input parameter may be a temporary identity parameter C-RNTI4 that is allocated by an RN1 to the RN2, where it should be particularly noted that each time when the RN2 re-accesses a new DeNB, the obtained C-RNTI4 is different; or the fourth transfer input parameter may be a random value parameter NONCE4 that is negotiated by the RN1 with the RN2.

The fifth input parameter may be a fifth transfer input parameter, and when a UE accesses the network, the fifth transfer input parameter may be a temporary identity parameter C-RNTI5 that is allocated by the RN2 to the UE, where it should be particularly noted that each time when the UE re-accesses the new DeNB, the obtained C-RNTI5 is different; or the fifth transfer input parameter may be a random value parameter NONCE5 that is negotiated by the eNB with the RN1.

Alternatively, the fourth input parameter and the fifth input parameter may also be other input parameters, for example, an id of a corresponding RN or a carrier frequency point of the corresponding RN. The input parameter may include, but is not limited to, one or any combination of the preceding three types of parameters.

Step 307: The eNB sends the initial key $K_{eNB}$ and the fourth input parameter to the RN1.

Step 308: The eNB and the RN1 obtain a root key $K_{eNB}'$ between the eNB and the RN1 according to the initial key $K_{eNB}$, the eNB and the RN1 obtain keys used for protecting UP data and CP data according to the root key $K_{eNB}'$, a method for obtaining the $K_{eNB}'$ is as follows:

$$K_{eNB}=KDF(K_{eNB}, f(\text{a sixth local input parameter})),$$

where when the RN1 accesses the network, the sixth local input parameter may be a temporary identity parameter C-RNTI6 that is allocated by the eNB to the RN1, where each time when the RN1 re-accesses the new DeNB, the obtained C-RNTI6 is different; or the sixth local input parameter may be an RRC message count value parameter RRC MESSAGE COUNT6 of a specific UE between the eNB and the RN1; or the sixth local input parameter may be a random value parameter NONCE6 that is negotiated by the eNB with the RN1, and the local input parameter may include, but is not limited to, one or any combination of the preceding three types of parameters.

The keys used for protecting the UP data and the CP data between the eNB and the RN1 are obtained according to the root key $K_{eNB}'$, where a UP data protection key is a UP encryption key $K_{UPenc}$, CP data protection keys are a CP encryption key $K_{RRCenc}$ and a CP integrity protection key $K_{RRCi\,int}$, a method for obtaining the three keys is made reference to the formula for obtaining $K_{AS}$, an input key is the $K_{eNB}'$, and in the following, obtaining of the key $K_{UPenc}$ is taken as an example for description, that is:

$$K_{UPenc} = KDF(K_{eNB}', f(\text{UP encryption algorithm type distinguisher,UP encryption algorithm id})),$$

where the UP encryption algorithm type distinguisher is a distinguisher for a UP encryption algorithm type, and the UP encryption algorithm id is an ID of a UP encryption algorithm.

Step 309: The eNB sends the initial key $K_{RN1}$, the initial key $K_{eNB}$, and the fifth input parameter to the RN2.

Step 310: The RN1 obtains the initial key $K_{RN1}$ of the RN1 according to the initial key $K_{eNB}$ of the eNB and the fifth input parameter, the RN1 and the RN2 obtain a root key $K_{RN1}'$ between the RN1 and the RN2 according to the initial key $K_{RN1}$, and according to the root key $K_{RN1}'$, the RN1 and the RN2 obtain air interface keys $K_{UPenc}$, $K_{RRCenc}$, and $K_{RRCi\ int}$ that are used for protecting UP data and CP data between the RN1 and the RN2. An obtaining method is similar to a method for obtaining $K_{AS}$ in an LTE system, and is not described in detail here, and a method for obtaining the $K_{RN1}'$ is as follows:

$$K_{RN1}' = KDF(K_{RN1}, f(\text{a seventh local input parameter})),$$

where the input key is the $K_{RN1}$, and the seventh local input parameter may be an RRC message count value parameter RRC MESSAGE COUNT7 that is related to a specific UE between the RN1 and the RN2, or the seventh local input parameter may be a temporary identity parameter C-RNTI7 that is allocated by the RN1 to the RN2, or the seventh local input parameter may be a random value parameter NONCE7 that is negotiated by the RN1 with the RN2, where the local input parameter may include, but is not limited to, one or any combination of the preceding three types of parameters.

Step 311: The RN2 obtains an initial key $K_{RN2}$ of the RN2 according to the initial key $K_{eNB}$ of the eNB and the fifth input parameter, and a method for obtaining the $K_{RN2}$ is similar to the obtaining method in step 306.

Step 312: The RN2 sends the fifth input parameter to the UE.

Step 313: The UE locally obtains $K_{NAS}$ and the initial keys $K_{eNB}$ and $K_{RN2}$, a method for obtaining the initial key $K_{eNB}$ is made reference to the formula for obtaining the $K_{eNB}$, and is not described in detail here; a method for obtaining the initial key $K_{RN2}$ is similar to the method for obtaining the $K_{RN2}$ in step 306, the RN2 and the UE obtain a root key $K_{RN2}'$ between the RN2 and the UE according to the initial key $K_{RN2}$, the RN2 and the UE obtain an air interface key used for protecting UP data and CP data between the UE and the RN2 according to the $K_{RN2}'$ where a method for obtaining the $K_{RN2}'$ may include the following two manners.

a. $K_{RN2}' = KDF(K_{RN2}, f(\text{an eighth local input parameter}))$, where the input key is the $K_{RN2}$, and the eighth local input parameter may be an RRC message count value parameter RRC MESSAGE COUNT8 between the RN2 and the UE, or the eighth local input parameter may be a temporary identity parameter C-RNTI8 that is allocated by the RN2 to the UE, or the eighth local input parameter may be a random value parameter NONCE8 that is negotiated by the RN2 with the UE, where the input parameter may include, but is not limited to, one or any combination of the preceding three types of parameters.

b. The $K_{RN2}$ is updated by adopting an intra-cell handover manner, so as to obtain the $K_{RN2}'$, and a specific method is:

$$K_{RN2}' = KDF(K_{RN2}, f(PCI, EARFCN-DL))$$

where the input key may be the key $K_{RN2}$ that is used before handover, the input parameter PCI may be a target cell physical identity, and the EARFCN-DL may be the number of target cell radio frequency channels.

In this embodiment of the present invention, the eNB obtains an initial key of each lower-level node according to the $K_{eNB}$, the eNB forwards the initial key of each lower-level node, and obtains an input parameter that is used by the initial key, so that each lower-level node obtains a root key of an air interface protection key each lower-level node according to the initial key and the input parameter, and data of the UE on a Un interface link may be respectively protected, that is, each active UE has a set of security parameters on the Un interface link, and furthermore, effective security protection is performed on data on each segment of an air interface.

Figure 4:
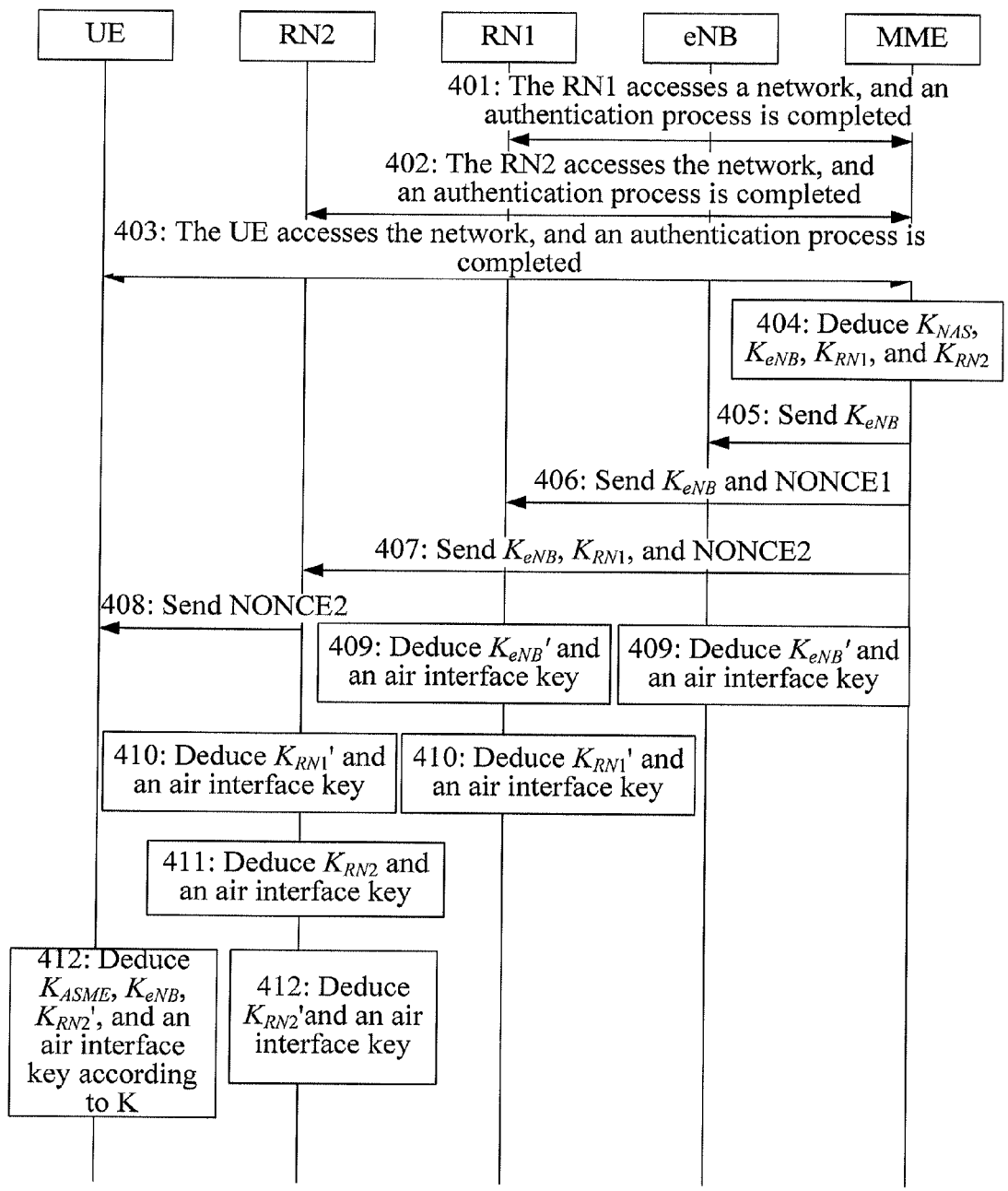
FIG. 4 is a flow chart of a method for obtaining a security key in a relay system according to a fourth embodiment of the present invention.

FIG. 4 is a flow chart of a method for obtaining a security key in a relay system according to a fourth embodiment of the present invention. In this embodiment, a difference from the third embodiment is that initial keys of an eNB and an RN are collectively obtained in an MME, and then, an obtained result is delivered or the obtained result and a parameter are delivered to each node, as shown in FIG. 4.

Steps 401 to 403 are similar to steps 201 to 203 in the second embodiment, and are not described in detail here, where differences lie in that:

Step 404: The MME obtains $K_{NAS}$ and an initial key $K_{eNB}$ of the eNB under the MME according to a key $K_{ASME}$ that is generated in an authentication process of a UE, and an obtaining method is as follows:

$$K_{eNB} = KDF(K_{ASME}, f(UL\ NAS\ COUNT))$$

$$K_{RN1} = KDF(K_{ASME}, f(\text{a tenth input parameter}))$$

$$K_{RN2} = KDF(K_{ASME}, f(\text{an eleventh input parameter})),$$

where, an input key is the key $K_{ASME}$ that is generated in the authentication process, the UL NAS COUNT is a count value parameter of uplink NAS signaling of the UE in the MME, the tenth input parameter may include a tenth transfer input parameter, the tenth transfer input parameter may be a random value parameter NONCE10 or an NAS COUNT value between the MME and a corresponding RN, the eleventh input parameter may be an eleventh transfer input parameter, and the eleventh transfer input parameter may be a random value parameter NONCE11 or an NAS COUNT value between the MME and the corresponding RN, where the input parameter may include, but is not limited to, one or any combination of the preceding three types of parameters.

Step 405: The MME sends the initial key $K_{eNB}$ to the eNB.

Step 406: The MME sends the initial key $K_{eNB}$ and the tenth input parameter to an RN1.

Step 407: The MME sends the initial key $K_{eNB}$, $K_{RN1}$, and the eleventh input parameter to an RN2.

Step 408: The RN2 sends the eleventh input parameter to the UE.

Step 409: The RN1 and the eNB obtain a root key $K_{eNB}'$ according to the initial key $K_{eNB}$, according to the root key $K_{eNB}'$, the RN1 and the eNB obtain air interface keys that are used for protecting UP data and CP data between the RN1 and the eNB, and an obtaining method is as follows:

$$K_{eNB}' = KDF(K_{eNB}, f(\text{a twelfth local input parameter})),$$

where when the RN1 accesses a network, the twelfth local input parameter may be a temporary identity parameter C-RNTI12 that is allocated by the eNB to the RN1, where each time when the RN1 re-accesses a new DeNB, the obtained C-RNTI12 is different; or the twelfth local input parameter may be an RRC message count value parameter RRC MESSAGE COUNT12 of a specific UE between the eNB and the RN1; or the twelfth local input parameter may be a random value parameter NONCE12 that is negotiated by the eNB with the RN1, and the local input parameter may include, but is not limited to, one or any combination of the preceding three types of parameters.

The keys used for protecting the UP data and the CP data between the RN1 and the eNB are obtained according to the root key $K_{eNB}'$, UP data protection key is a UP encryption key $K_{UPenc}$, CP data protection keys are a CP encryption key $K_{RRCenc}$ and a CP integrity protection key $K_{RRCi\ int}$, a method for obtaining the three keys is made reference to a formula for obtaining $K_{AS}$, the input key is $K_{eNB}'$, and in the following, obtaining of the key $K_{UPenc}$ is taken as an example for description, that is:

$$K_{UPenc} = KDF(K_{eNB}', f(\text{UP encryption algorithm type distinguisher, UP encryption algorithm id})),$$

where the UP encryption algorithm type distinguisher is a distinguisher for a UP encryption algorithm type, and the UP encryption algorithm id is an ID of a UP encryption algorithm.

Step 410: The RN1 obtains the initial key $K_{RN1}$ of the RN1 according to the initial key of the $K_{eNB}$ eNB and the tenth input parameter, and an obtaining method is similar to that in step 404, and is not described in detail here; the RN1 and the RN2 respectively obtain a root key $K_{RN1}'$ between the RN1 and the RN2 according to the initial key $K_{RN1}$, and an obtaining method is similar to that in step 310 in the third embodiment, and is not described in detail here; the RN1 and the RN2 obtain air interface protection keys $K_{UPenc}$, $K_{CPenc}$, and $K_{CP\ int}$, that are used for protecting UP data and CP data between the RN 1 and the RN2 according to the root key $K_{RN1}'$.

Step 411: The RN2 obtains an initial key $K_{RN2}$ between the RN2 and the UE according to the initial key $K_{eNB}$ between the RN1 and the eNB, and the eleventh input parameter, and an obtaining method is similar to that in step 404.

Step 412: The UE locally obtains the initial key $K_{eNB}$ of the eNB, the UE obtains the initial key $K_{RN2}$ of the RN2 according to the $K_{eNB}$ and the eleventh input parameter, the UE and the RN2 obtain a root key $K_{RN2}'$ between the RN2 and the UE according to the initial key $K_{RN2}$ of the RN2, according to the $K_{RN2}'$, the RN2 and the UE obtain air interface keys $K_{UPenc}$, $K_{RRCenc}$, and $K_{RRC\ int}$ that are used for protecting CP data and UP data between the UE and the RN2, an obtaining method is similar to the method for obtaining $K_{AS}$ in an LTE system, and is not described in detail here, and the method for obtaining the $K_{RN2}'$ is as follows.

a. $K_{RN2}' = KDF\ (K_{RN2}, f$ (a thirteenth local input parameter)), where, the input key is the $K_{RN2}$, and when the UE accesses the network, the thirteenth local input parameter may be a temporary identity parameter C-RNTI13 that is allocated by the RN2 to the UE; or the thirteenth input parameter may be an RRC message count value parameter RRC MESSAGE COUNT13 between the RN2 and the UE; or the thirteenth local input parameter may be a random value parameter NONCE13 that is negotiated by the RN2 with the UE. The local input parameter may include, but is not limited to, one or any combination of the preceding three types of parameters.

b. The $K_{RN2}$ is updated by adopting an intra-call handover manner to obtain the $K_{RN2}'$, and an updating method is similar to that in 313 (b), and is not described in detail here.

In this embodiment of the present invention, the mobility management entity MME obtains the initial key of the lower-level node of the eNB under the MME and the initial key of the eNB according to the key that is generated in the authentication process of the MME, and the MME sends the initial key of the eNB or the initial key of the lower-level node to the lower-level node, so that the lower-level node obtains a root key of an air interface protection key between the lower-level node and a directly lower-level node of the lower-level node according to the initial key of the eNB or the key that is generated in the authentication process of the lower-level node and the MME. Therefore, data of the UE on a Un interface link may be respectively protected, that is, each active UE has a set of security parameters on the Un interface link, so that effective security protection is performed on data on each segment of an air interface.

Figure 5:
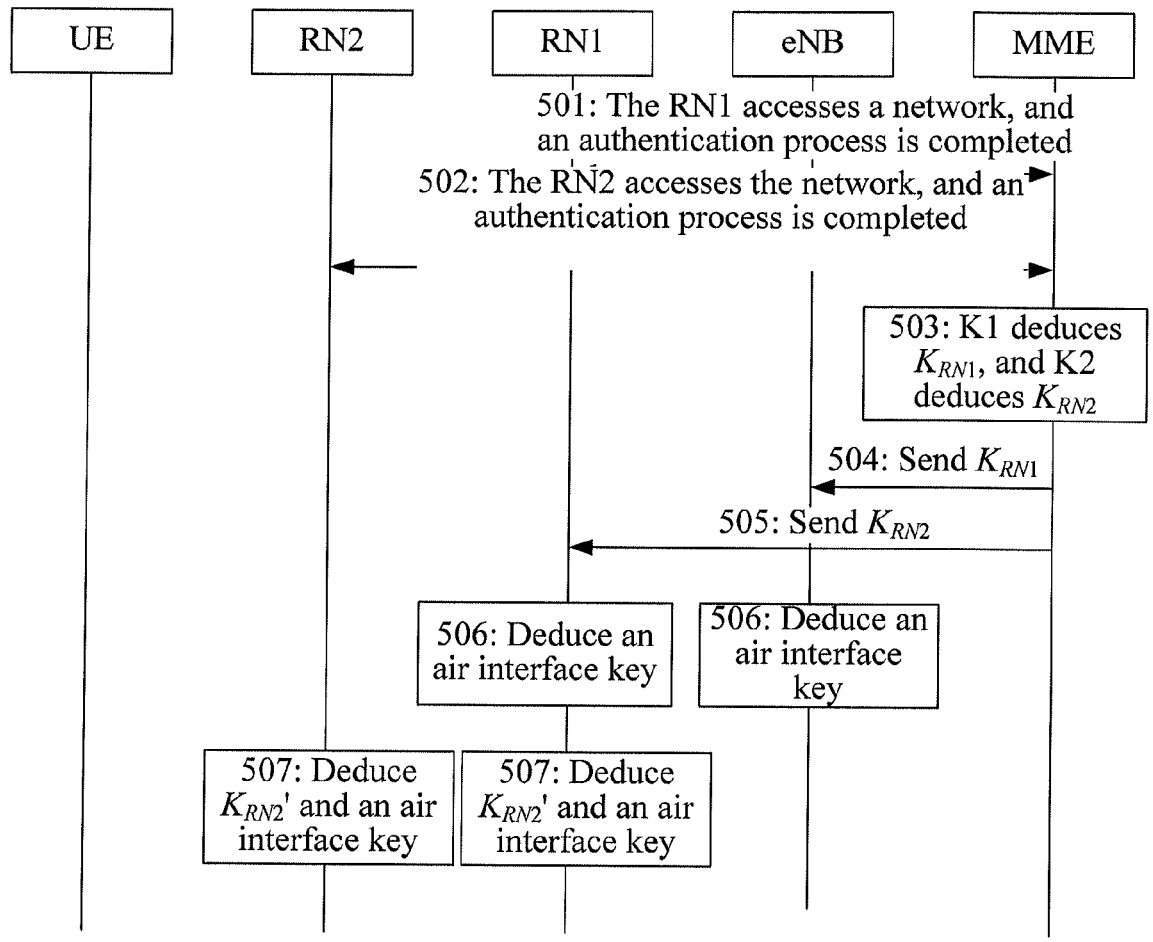
FIG. 5 is a flow chart of a method for obtaining a security key in a relay system according to a fifth embodiment of the present invention.

FIG. 5 is a flow chart of a method for obtaining a security key in a relay system according to a fifth embodiment of the present invention. In this embodiment, a protection key of a Un interface link is based on a permanent key Ka of an RN, and may be used for protecting a specific RB of the RN, and may also used for protecting RBs of all UEs that belong to the RN. An input parameter in this embodiment may be a local input parameter. As shown in FIG. 5:

Step 501: An RN1 accesses a network, and an authentication process is completed, where in the authentication process, a key $K_{ASME\_}$RN1 is obtained by using the Ka.

Step 502: An RN2 accesses the network, and an authentication process is completed, where in the authentication process, a key $K_{ASME\_}$RN2 is obtained by using a Kb.

Step 503: An MME and the RN1 respectively obtain $K_{NAS}$ and an initial key $K_{RN1}$ of the RN1 according to the key $K_{ASME\_}$RN1 that is generated in the authentication process, the MME and the RN2 respectively obtain $K_{NAS}$ and an initial key $K_{RN2}$ of the RN2 according to the key $K_{ASME\_}$RN2 that is generated in the authentication process, an obtaining method may be referred to the formula for obtaining $K_{NAS}$, and an input key is the key that is generated in the authentication process.

Step 504: The MME sends the obtained initial key $K_{RN1}$ to an eNB.

Step 505: The MME sends the obtained initial key $K_{RN2}$ to the RN1.

Step 506: According to the initial key $K_{RN1}$, the RN1 and the eNB obtain air interface keys that are used for protecting UP data and CP data between the RN1 and the eNB, an obtaining method is similar to a method for obtaining $K_{NAS}$ in an LTE system, and the input key is the $K_{RN1}$.

Step 507: According to the initial key $K_{RN2}$, the RN2 obtains a root key $K_{RN2}'$ between the RN1 and the RN2, and according to the root key $K_{RN2}'$, the RN1 and the RN2 obtain air interface keys that are used for protecting UP data and CP data between the RN1 and the RN2. An obtaining method is similar to a method for obtaining $K_{AS}$ in the LTE system, the input key is the $K_{RN2}'$, and the method for obtaining the $K_{RN2}'$ is:

$$K_{RN2}' = KDF(K_{RN2}, f(\text{a fourteenth input parameter})),$$

where the fourteenth input parameter may be an RRC message count value parameter RRC MESSAGE CONUT14 that is related to a specific UE between the RN1 and the RN2; or when the RN2 accesses the network, the fourteenth input parameter may be a temporary identity parameter C-RNTI14 that is allocated by the RN1 to the RN2; or the fourteenth input parameter may be a random value parameter NONCE14 that is negotiated by the RN1 with the RN2, where the input parameter may include, but is not limited to, one or any combination of the preceding three types of parameters.

In this embodiment of the present invention, the mobility management entity MME obtains an initial key of a lower-level node of the eNB under the MME and an initial key of the eNB according to the input parameter and the key that is generated in the authentication process of the MME, the MME sends the initial key of the eNB or the initial key of the lower-level node to the lower-level node, and the MME sends the input parameter to the lower-level node, so that the lower-level node obtains a root key of an air interface protection key between the lower-level node and a directly lower-level node of the lower-level node according to the input parameter and the initial key of the eNB, or the input parameter and the key that is generated in the authentication process of the lower-level node and the MME. Therefore, data of the UE on a Un interface link may be respectively protected, that is, each active UE has a set of security parameters on the Un interface link, so that effective security protection is performed on data on each segment of an air interface.

Each embodiment of the present invention may also be used in combination, for example, when the Un interface between the RN1 and the eNB has two types of bearers, that is, a bearer of the RN1 and a bearer of the UE respectively. For the bearer of the RN1, a key may be generated by using the method according to the fifth embodiment for performing protection, and for the bearer of the UE, the method according to the second embodiment may be used for performing protection. Similarly, for a bearer of the RN2 on the Un interface between the RN1 and the RN2, a key may also be generated by using the method according to the fifth embodiment for performing protection, and for the bearer of the UE on the Un interface between the RN1 and the RN2, the key may also be generated by using the method according to the second embodiment for performing protection. For the bearer of the UE on the Un interface between the RN1 and the eNB, the key may also be generated by using the method according to the third embodiment for performing protection, and for the bearer of the UE on the Un interface between the RN1 and the RN2, the key may also be generated by using the method according to the third embodiment for performing protection. For the bearer of the UE on the Un interface between the RN1 and the eNB, the key may also be generated by using the method according to the fourth embodiment for performing protection, and for the bearer of the UE on the Un interface between the RN1 and the RN2, the key may also be generated by using the method according to the fourth embodiment for performing protection.

Figure 6:
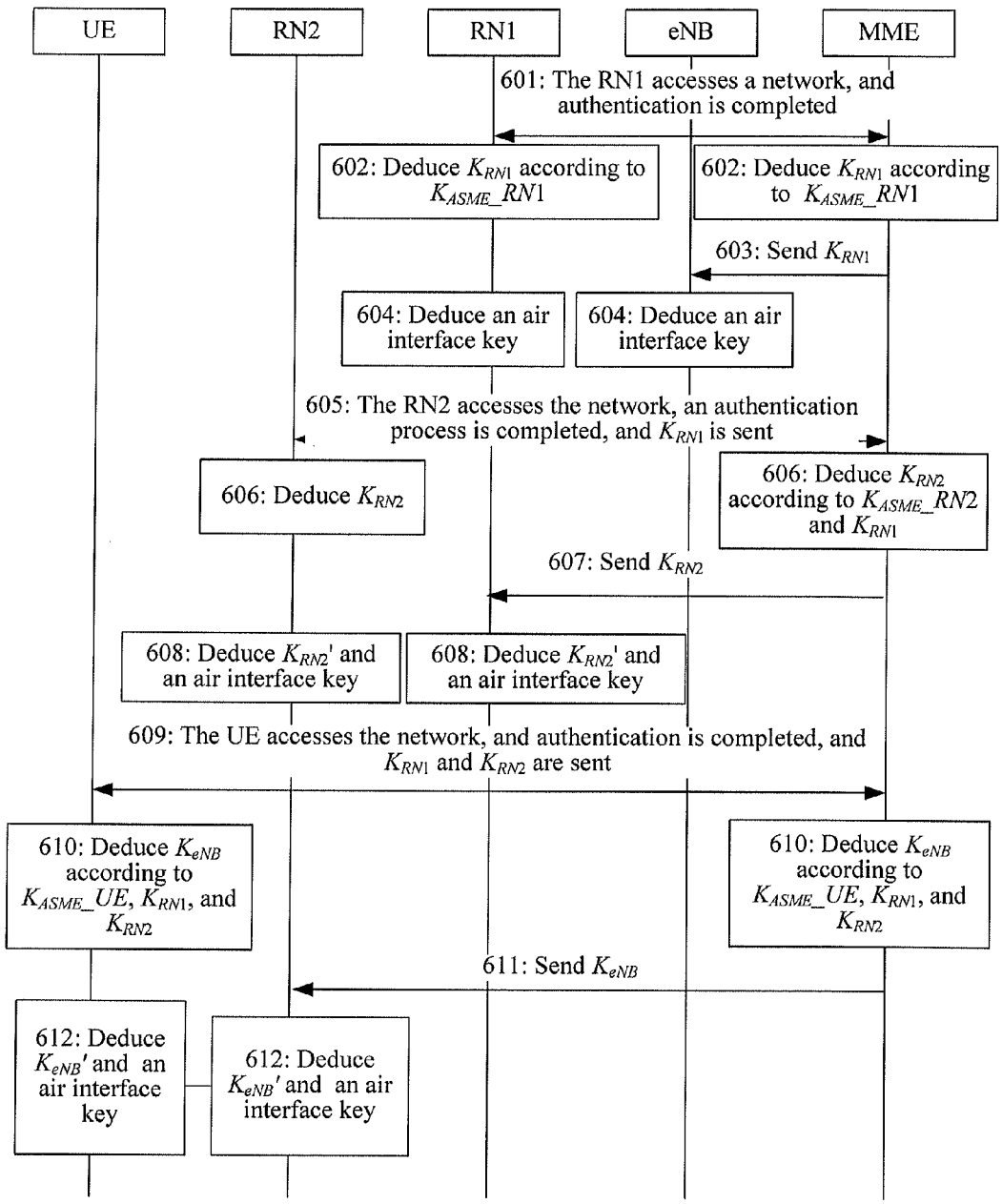
FIG. 6 is a flow chart of a method for obtaining a security key in a relay system according to a sixth embodiment of the present invention.

FIG. 6 is a flow chart of a method for obtaining a security key in a relay system according to a sixth embodiment of the present invention. In this embodiment, a protection key that is used by a lower-level RN is associated with a key that is used by an upper-level RN. An input parameter in this embodiment may be a local input parameter. As shown in FIG. 6:

Step 601: An RN1 accesses a network, and an authentication process is completed.

Step 602: An MME and the RN1 respectively obtain $K_{NAS}$ and an initial key $K_{RN1}$ of the RN1 according to a key $K_{ASME\_}$RN1 that is generated in the authentication process, an obtaining method may be similar to that in an LTE system, an input key is the key $K_{ASME\_}$RN1 that is generated in the authentication process, and an input parameter may be an Uplink NAS COUNT of the RN1.

Step 603: The MME sends the initial key $K_{RN1}$ to an eNB.

Step 604: According to the initial key $K_{RN1}$, the RN1 directly obtains air interface keys that are used for protecting UP data and CP data between the RN1 and the eNB, an obtaining method is similar to a method for obtaining $K_{AS}$ in the LTE system, and the input key is the $K_{RN1}$.

Step 605: An RN2 accesses the network, and an authentication process is completed, where in the authentication process of the RN2, the MME sends the initial key $K_{RN1}$ of the RN1 to the RN2.

Step 606: The MME and the RN2 obtain the $K_{NAS}$ and an initial key $K_{RN2}$ of the RN2 according to $K_{ASME\_}$RN2 that is generated in the authentication process and the initial key $K_{RN1}$ of the RN1, a method for obtaining the $K_{RN2}$ is as follows:

$$K_{RN2}=KDF(K_{ASME\_}RN2, K_{RN1}, f(\text{Uplink NAS COUNT of } RN^2)).$$

The input keys are the $K_{ASME\_}$RN2 and the $K_{RN1}$.

Step 607: The MME sends the initial key $K_{RN2}$ to the RN1.

Step 608: The RN2 obtains a root key $K_{RN2}'$ between the RN1 and the RN2 according to the $K_{RN2}$, according to the root key $K_{RN2}'$, obtains air interface keys that are used for protecting UP data and CP data between the RN1 and the RN2, an obtaining method is similar to the method for obtaining the $K_{AS}$ in the LTE system, and the input key is the $K_{RN2}'$.

Step 609: The UE accesses the network, an authentication process is completed, and the $K_{RN1}$ and $K_{RN2}$ are sent to the UE.

Step 610: The MME and the UE obtain initial keys $K_{eNB}$ and $K_{NAS}$ according to key $K_{ASME\_}$UE and the $K_{RN2}$ that are generated in the authentication process, where a method for obtaining the $K_{eNB}$ is as follows:

$$K_{eNB}=KDF(K_{ASME\_}UE, K_{RN2}, f(\text{Uplink NAS COUNT of } UE)).$$

The input keys are the $K_{ASME\_}$UE and the $K_{RN2}$.

Step 611: The MME sends the initial key $K_{eNB}$ of the eNB to the RN2.

Step 612: The RN2 obtains a root key $K_{eNB}'$ between the UE and the RN2 according to the initial key $K_{eNB}$, according to the $K_{eNB}'$, the RN2 and the UE obtain air interface keys that are used for protecting UP data and CP data between the RN2 and the UE, the input key is the $K_{RN2}'$, and a method for obtaining the $K_{eNB}'$ includes two manners.

a. Being similar to the method for obtaining the $K_{eNB}'$ in step 209 in the second method, an input key is $K_{eNB}$, a first input parameter may be an RRC message count value between the RN2 and the UE, or the first input parameter may be a C-RNTI that is allocated by the RN2 to the UE, or the first input parameter may be a fresh value NONCE that is negotiated by the RN2 and the UE; and the input parameter may include, but is not limited to, one or any combination of the preceding parameters.

b. The $K_{eNB}$ is updated by adopting an intra-cell handover manner, so as to obtain the root key $K_{eNB}'$, and an updating method is:

$$K_{eNB}'=KDF(K_{eNB}, f(PCI, EARFCN-DL)),$$

where the $K_{eNB}'$ may be an updated key, the input key may be the key $K_{eNB}$ that is used before handover, the input parameter may be a target cell PCI, and the EARFCN-DL is the number of target cell radio frequency channels.

In this embodiment of the present invention, a node in a relay system obtains an initial key, according to the initial key, the node obtains a root key of an air interface protection key between the node and another node that is directly adjacent to the node, and according to the root key, the node obtains the air interface protection key between the node and said another node that is directly adjacent to the node, so that data of the UE on a Un interface link may be respectively protected, that is, each active UE has a set of security parameters on the Un interface link, and effective security protection is performed on data on each segment of an air interface.

Figure 7:
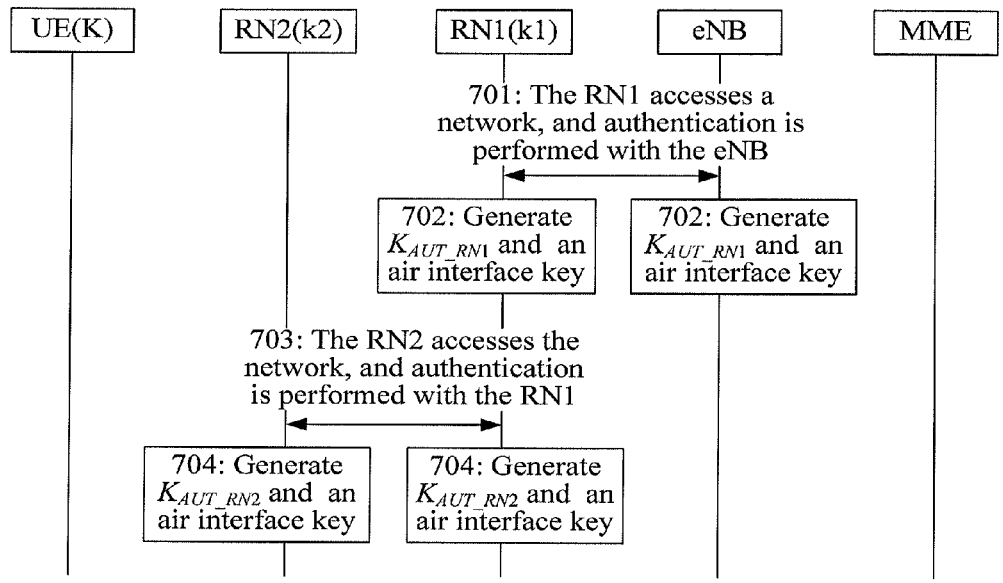
FIG. 7 is a flow chart of a method for obtaining a security key in a relay system according to a seventh embodiment of the present invention.

FIG. 7 is a flow chart of a method for obtaining a security key in a relay system according to a seventh embodiment of the present invention. In this embodiment, an RN at each level performs authentication with an upper-level node of the RN, and each segment of an air interface protection key is generated. As shown in FIG. 7:

Step 701: An RN1 accesses a network, and authentication is performed with an eNB.

Step 702: According to a root key $K_{AUT\_RN1}$ that is generated in the authentication process between the RN1 and the eNB, the RN1 and the eNB respectively obtain keys that are used for protecting UP data and CP data on an air interface between the RN1 and the eNB, an obtaining method is similar to a method for obtaining $K_{AS}$ in an LTE system, and an input key is $K_{RN1}$.

Step 703: An RN2 accesses the network, and authentication is performed with the RN1.

Step 704: According to a root key $K_{AUT\_RN2}$ that is generated in the authentication process between the RN1 and the RN2, the RN1 and the RN2 respectively obtain keys that are used for protecting UP data and CP data on an air interface between the RN1 and the RN2, an obtaining method is made reference to a formula for obtaining the $K_{AS}$, and the input key is $K_{RN2}$.

In this embodiment, a first relay node obtains a root key in a process of authentication procedure with an adjacent node of the first relay node, and according to the root key, the first relay node obtains an air interface protection key for performing protection between the first relay node and the adjacent node, where the adjacent node of the first relay node includes an upper-level node of the first relay node and/or a lower-level node of the first relay node, so that data on each node may be respectively protected, that is, each active UE has a set of security parameters on a Un interface link, and effective security protection is performed on data on each segment of an air interface.

This embodiment of the present invention may also be used in combination with the embodiments 1, 2, and 3, the method according to the seventh embodiment is used for protecting a bearer that is related to the RN on a Un interface, and the embodiments 1, 2, and 3 are used for protecting a bearer that is related to the UE on the Un interface.

Figure 8:
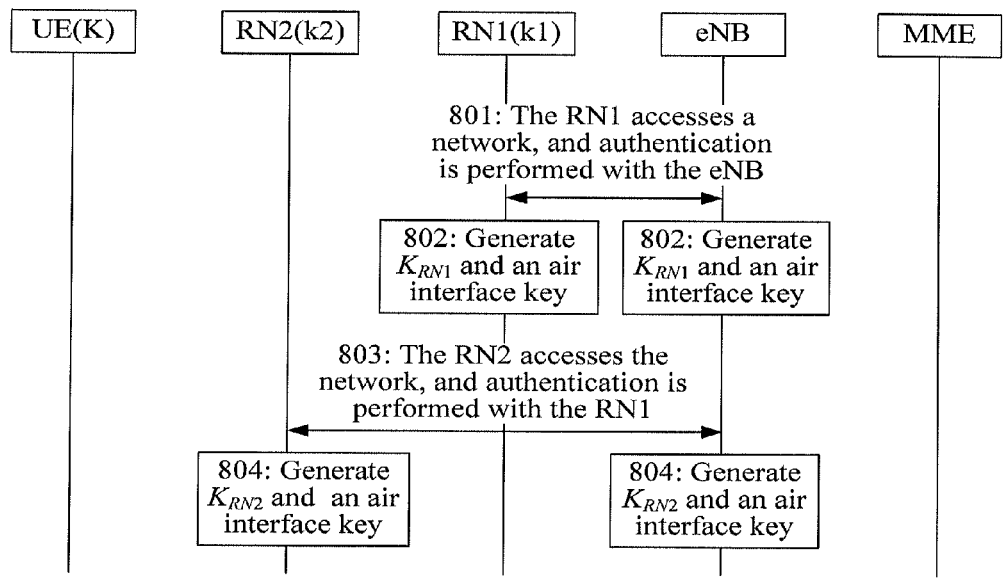
FIG. 8 is a flow chart of a method for obtaining a security key in a relay system according to an eighth embodiment of the present invention.

FIG. 8 is a flow chart of a method for obtaining a security key in a relay system according to an eighth embodiment of the present invention. In this embodiment, an RN at each level performs authentication with an eNB, so as to generate an air interface protection key of each segment, As shown in FIG. 8:

Step 801: An RN1 accesses a network, and authentication is performed with an eNB.

Step 802: According to a root key $K_{RN1}$ that is generated in the authentication process between the eNB and the RN1, the eNB and the RN1 respectively obtain keys that are used for protecting UP data and CP data on an air interface between the eNB and the RN1.

Step 803: An RN2 accesses the network, and authentication is performed with the eNB.

Step 804: The eNB and the RN2 respectively generate an initial key $K_{RN2}$ of the RN2 in the authentication process, and the eNB forwards the initial key $K_{RN2}$ to the RN1. The RN1 and the RN2 respectively obtain a root key $K_{RN2}'$ between the RN1 and the RN2 according to the $K_{RN2}$, and according to the $K_{RN2}'$, obtain keys that are used for protecting UP data and CP data on an air interface between the RN1 and the RN2.

In this embodiment, a first relay node obtains a root key in a process of authentication with an adjacent node of the first relay node, and according to the root key, the first relay node obtains an air interface protection key for performing protection between the first relay node and the adjacent node, where the adjacent node of the first relay node includes an upper-level node of the first relay node and/or a lower-level node of the first relay node, so that data on each node may be respectively protected, that is, each active UE has a set of security parameters on a Un interface link, and effective security protection is performed on data on each segment of an air interface.

This embodiment of the present invention may also be used in combination with the embodiments 1, 2, and 3, the method according to the eighth embodiment is used for protecting a bearer that is related to the RN on a Un interface, and the embodiments 1, 2, and 3 are used for protecting a bearer that is related to the UE on the Un interface, so that data of the UE on a Un interface link may be respectively protected, that is, each active UE has a set of security parameters on the Un interface link, and effective security protection is performed on data on each segment of an air interface.

FIG. 9 is a flow chart of a method for obtaining a security key in a relay system according to a ninth embodiment of the present invention.

Step 901: A first relay node obtains a root key in a process of authentication with an adjacent node of the first relay node.

Step 902: According to the root key, the first relay node obtains an air interface protection key for performing protection between the first relay node and the adjacent node.

The adjacent node of the first relay node includes an upper-level node of the first relay node and/or a lower-level node of the first relay node.

In this embodiment of the present invention, a node in a relay system obtains an initial key, according to the initial key, the node obtains a root key of an air interface protection key between the node and another node that is directly adjacent to the node, and according to the root key, the node obtains the air interface protection key between the node and said another node that is directly adjacent to the node, so that data of a UE on a Un interface link may be respectively protected, that is, each active UE has a set of security parameters on the Un interface link, and effective security protection is performed on data on each segment of an air interface.

FIG. 10 is a schematic structural diagram of a node in a relay system according to an embodiment of the present invention, which includes:

an obtaining module 1001, configured to obtain an initial key by the node in the relay system.

a first obtaining module 1002, configured to, according to the initial key obtained by the obtaining module, obtain a root key of an air interface protection key between the node and another node that is directly adjacent to the node.

a second obtaining module 1003, configured to, according to the root key obtained by the first obtaining module, obtain the air interface protection key between the node and said another node that is directly adjacent to the node.

The obtaining module is specifically configured to: when the node in the relay system is an eNB, obtains the initial key from a mobility management entity MME.

The obtaining module is specifically configured to: when the node in the relay system is a relay node RN, obtains the initial key from the MME or the eNB.

The obtaining module is specifically configured to: when the node in the relay system is a user equipment UE, obtains the initial key from an upper-level node of the UE.

Furthermore, the device further includes:

The obtaining module is further configured to: when the node in the relay system is the eNB, obtains an initial key of a lower-level node of the eNB according to a transfer input parameter and the initial key that is obtained by the obtaining module.

A sending module 1004 is configured to: sends the initial key to one of lower-level nodes of the node, and sends the transfer input parameter to a node that is directly adjacent to one of the lower-level nodes of the node, so that according to the transfer input parameter and the initial key, one of the lower-level nodes of the node and the node that is directly adjacent to one of the lower-level nodes of the node obtain a root key of an air interface protection key between one of the lower-level nodes of the node and the node that is directly adjacent to one of lower-level nodes of the node.

Furthermore, when the node in the relay system is a relay node RN, the device further includes:

A receiving module 1005 is configured to: the RN receives a transfer input parameter of an upper-level node.

The first obtaining module is further configured to: the RN obtains, according to the initial key and the transfer input parameter, the root key of the air interface protection key between the node and the node that is directly adjacent to the node.

Furthermore, when the node in the relay system is a relay node UE, the device further includes:

The receiving module is further configured to: when the node in the relay system is a relay node UE, receives a transfer input parameter of an upper-level node.

The first obtaining module is further configured to: the UE obtains, according to the initial key and the transfer input parameter, the root key of the air interface protection key between the node and the node that is directly adjacent to the node.

In this embodiment of the present invention, the node in the relay system obtains the initial key, according to the initial key, the node obtains the root key of the air interface protection key between the node and said another node that is directly adjacent to the node, and according to the root key, the node obtains the air interface protection key between the node and said another node that is directly adjacent to the node, so that data of the UE on a Un interface link may be respectively protected, that is, each active UE has a set of security parameters on the Un interface link, and effective security protection is performed on data on each segment of an air interface.

FIG. 11 is a schematic structural diagram of a relay node according to an embodiment of the present invention, which includes:

A first obtaining module 1101 is configured to: a first relay node obtains a root key in a process in which the first relay node authenticates with an adjacent node of the first relay node.

A second obtaining module 1102 is configured to: the first relay node obtains, according to the root key that is obtained by the first obtaining module, an air interface protection key for performing protection between the first relay node and the adjacent node.

The adjacent node of the first relay node includes an upper-level node of the first relay node and/or a lower-level node of the first relay node.

In this embodiment of the present invention, a node in a relay system obtains an initial key, according to the initial key, the node obtains a root key of an air interface protection key between the node and another node that is directly adjacent to the node, and according to the root key, the node obtains the air interface protection key between the node and said another node that is directly adjacent to the node, so that data of a UE on a Un interface link may be respectively protected, that is, each active UE has a set of security parameters on the Un interface link, and effective security protection is performed on data on each segment of an air interface.

Through the preceding description of each embodiment, persons skilled in the art may clearly understand that the present invention may be accomplished with software on a necessary universal hardware platform, and definitely may also be accomplished through hardware, however, in many cases, the former is preferred implementation. Therefore, based on this understanding, the technical solutions of the present invention in essence or a part that makes contributions to the prior art may be embodied in the form of a software product. The computer software product may be stored in a storage medium including several instructions to instruct a computer equipment (may be a personal computer, a server, or a network equipment) to perform the method in each embodiment of the present invention.

Although the present invention is illustrated and described with reference to some exemplary embodiments of the present invention, persons skilled in the art should understood that various changes may be made to forms and details without departing from the spirit and scope of the present invention.

What is claimed is:

1. A method for obtaining a security key in a relay system, comprising:

generating, by a first node and a network side, an initial key of the first node, so that the network side sends the initial key to an upper-level node that is directly adjacent to the first node, and the upper-level node obtains a root key of the upper-level node according to the initial key, and according to the root key of the upper-level node, obtains an air interface protection key for performing protection between the first node and the upper-level node;

obtaining, by the first node, a root key of the first node according to the initial key; and according to the root key of the first node, obtaining, by the first node, the air interface protection key for performing protection between the first node and the upper-level node;

generating, by the first node and the network side, an input parameter of the first node, and further sending, by the network side, the input parameter to the upper-level node that is directly adjacent to the first node, so that the upper-level node obtains the root key of the upper-level node according to the initial key and the input parameter, and according to the root key of the upper-level node, obtains the air interface protection key for performing protection between the first node and the upper-level node; and wherein the obtaining, by the first node, the root key of the first node according to the initial key comprises:

according to the initial key of the first node and the input parameter, obtaining, by the first node, a root key of the air interface protection key for performing protection between the first node and the upper-level node;

wherein according to the initial key of the first node and the input parameter, the obtaining, by the first node, the root key of the air interface protection key for performing protection between the first node and the upper-level node is specifically implemented through the following formula:

$$K_{root\ key} = KDF(K_{initial\ key}, f(\text{an input parameter})),$$

wherein, the $K_{root\ key}$ is a root key of an air interface protection key between the node and the upper-level node that is directly adjacent to the node, the KDF is a key derivation function, the $K_{initial\ key}$ is the initial key, and f is a function, and the input parameter comprises any one of the following parameters:

a temporary identity parameter C-RNTI of the node and a temporary identity parameter C-RNTI of the upper-level node that is directly adjacent to the node;

a count value parameter RRC MESSAGE COUNT in a radio resource control (RRC) message between the node and said the upper-level node that is directly adjacent to the node;

a random value parameter NONCE that is negotiated by the node with said upper-level node that is directly adjacent to the node;

a physical cell identity PCI and a radio frequency channel number EARFCN-DL of said the upper-level node that is directly adjacent to the node; and a count value parameter Uplink NAS COUNT in an uplink non-access stratum (NAS) message of said the upper-level node that is directly adjacent to the node.

2. A method for obtaining a security key in a relay system, comprising:

obtaining, by a node in the relay system, an initial key;

according to the initial key, obtaining, by the node, a root key of an air interface protection key between the node and another node that is directly adjacent to the node; and according to the root key, obtaining, by the node, the air interface protection key between the node and said another node that is directly adjacent to the node;

when the node in the relay system is an eNB, the obtaining, by the node in the relay system, the initial key comprises:

obtaining, by the eNB, the initial key from a mobility management entity MME; and when the node in the relay system is a relay node RN, the obtaining, by the node in the relay system, the initial key comprises:

obtaining, by the RN, the initial key from the MME or the eNB, or obtaining, by the RN, a stored initial key from the RN;

wherein according to the initial key, the obtaining, by the node, the root key of the air interface protection key between the node and said another node that is directly adjacent to the node is specifically implemented through the following formula:

$$K_{root\ key}=KDF(K_{initial\ key}, f(\text{an input parameter})),$$

wherein, the $K_{root\ key}$ is the root key of the air interface protection key between the node and said another node that is directly adjacent to the node, the KDF is a key derivation function (KDF), the $K_{initial\ key}$ is the initial key, and f is a function, and the input parameter comprises any one of the following parameters:

a temporary identity parameter C-RNTI of the node and a temporary identity parameter C-RNTI of said another node that is directly adjacent to the node;

a count value parameter RRC MESSAGE COUNT in a radio resource control (RRC) message between the node and said another node that is directly adjacent to the node;

a random value parameter NONCE that is negotiated by the node with said another node that is directly adjacent to the node;

a physical cell identity PCI and a radio frequency channel number EARFCN-DL of said another node that is directly adjacent to the node; and a count value parameter Uplink NAS COUNT in an uplink non-access stratum (NAS) message of said another node that is directly adjacent to the node.

3. The method according to claim 2, wherein when the node in the relay system is an eNB, the method further comprises:

obtaining, by the eNB, a root key of a lower-level node of the eNB according to the input parameter and the initial key; and sending, by the eNB, the initial key and the input parameter to a first node and a second node, so that according to the input parameter and the initial key, the first node and the second node obtain a root key of an air interface protection key between the first node and the second node, the first node is one of lower-level nodes of the eNB; and the second node is a node that is directly adjacent to one of the lower-level nodes of the eNB.

4. The method according to claim 2, wherein when the node in the relay system is a relay node RN, the method further comprises:

receiving, by the RN, an input parameter sent by an upper-level node, or obtaining, by the RN, a locally generated input parameter; and according to the initial key, the obtaining, by the node, the root key of the air interface protection key between the node and said another node that is directly adjacent to the node specifically comprises:

according to the initial key and the input parameter, obtaining, by the RN, the root key of the air interface protection key between the node itself and said another node that is directly adjacent to the node itself.

5. The method according to claim 2, wherein when the node in the relay system is a user equipment UE, the method further comprises:

receiving, by the UE, an input parameter sent by an upper-level node; and according to the initial key, the obtaining, by the node, the root key of the air interface protection key between the node and said another node that is directly adjacent to the node specifically comprises:

according to the initial key and the input parameter, obtaining, by the UE, the root key of the air interface protection key between the node itself and said another node that is directly adjacent to the node itself.

6. A node in a relay system, comprising:

an processor, configured to obtain an initial key;

the processor, configured to, according to the initial key, obtain a root key of an air interface protection key between the node and another node that is directly adjacent to the node; and configured to, according to the root key, obtain the air interface protection key between the node and said another node that is directly adjacent to the node;

the processor is specifically implemented through the following formula:

$$K_{root\ key}=KDF(K_{initial\ key}, f(\text{an input parameter})),$$

wherein, the $K_{root\ key}$ is the root key of the air interface protection key between the node and said another node that is directly adjacent to the node, the KDF is a key derivation function (KDF), the $K_{initial\ key}$ is the initial key, and f is a function, and the input parameter comprises any one of the following parameters:

a temporary identity parameter C-RNTI of the node and a temporary identity parameter C-RNTI of said another node that is directly adjacent to the node;

a count value parameter RRC MESSAGE COUNT in a radio resource control (RRC) message between the node and said another node that is directly adjacent to the node;

a random value parameter NONCE that is negotiated by the node with said another node that is directly adjacent to the node;

a physical cell identity PCI and a radio frequency channel number EARFCN-DL of said another node that is directly adjacent to the node; and a count value parameter Uplink NAS COUNT in an uplink non-access stratum (NAS) message of said another node that is directly adjacent to the node.

7. The node according to claim 6, wherein the processor is specifically configured to:

when the node in the relay system is an eNB, obtain the initial key from a mobility management entity MME; or when the node in the relay system is a relay node RN, obtain the initial key from the MME or the eNB; or when the node in the relay system is a user equipment UE, obtain the initial key from an upper-level node of the UE.

8. The node according to claim 6, wherein, the processor is further configured to: when the node in the relay system is an eNB, obtain an initial key of a lower-level node of the eNB according to an input parameter and the initial key; and a transmitter is configured to: send the initial key and the input parameter that are obtained to a first node and a second node, so that according to the input parameter and the initial key that are obtained, the first node and the second node obtain a root key of an air interface protection key between the first node and the second node, wherein the first node is one of lower-level nodes of the eNB, and the second node is a node that is directly adjacent to one of the lower-level nodes of the eNB.

9. The node according to claim 6, wherein, the device further comprises:

a receiver is configured to: when the node in the relay system is a relay node RN, receive an input parameter sent by an upper-level node, wherein the processor is further configured to: obtain, according to the initial key obtained and the input parameter received by the receiver, the root key of the air interface protection key between the node and the node that is directly adjacent to the node.

10. The node according to claim 6, wherein, the device further comprises:

a receiver is further configured to: when the node in the relay system is a user equipment UE, receive an input parameter of an upper-level node; and the processor is further configured to: obtain, according to the initial key obtained and the input parameter received by the receiver, the root key of the air interface protection key between the node and the node that is directly adjacent to the node.

11. A apparatus for obtaining a security key in a relay system, comprising:

a processor, configured to generate an initial key of the first node, so that the network side sends the initial key to an upper-level node that is directly adjacent to the first node, and the upper-level node obtains a root key of the upper-level node according to the initial key, and according to the root key of the upper-level node, obtains an air interface protection key for performing protection between the first node and the upper-level node;

the processor, configured to obtain a root key of the first node according to the initial key; and according to the root key of the first node, obtain the air interface protection key for performing protection between the first node and the upper-level node;

the processor, configured to generate an input parameter of the first node, and further sending, by the network side, the input parameter to the upper-level node that is directly adjacent to the first node, so that the upper-level node obtains the root key of the upper-level node according to the initial key and the input parameter, and according to the root key of the upper-level node, obtains the air interface protection key for performing protection between the first node and the upper-level node; and the processor specifically configured to:

according to the initial key of the first node and the input parameter, obtain a root key of the air interface protection key for performing protection between the first node and the upper-level node;

the processor is specifically implemented through the following formula:

$$K_{root\ key}=KDF(K_{initial\ key}, f(\text{an input parameter})),$$

wherein, the $K_{root\ key}$ is a root key of an air interface protection key between the node and upper-level node that is directly adjacent to the node, the KDF is a key derivation function, the $K_{initial\ key}$ is the initial key, and f is a function, and the input parameter comprises any one of the following parameters:

a temporary identity parameter C-RNTI of the node and a temporary identity parameter C-RNTI of upper-level node that is directly adjacent to the node;

a count value parameter RRC MESSAGE COUNT in a radio resource control (RRC) message between the node and said upper-level node that is directly adjacent to the node;

a random value parameter NONCE that is negotiated by the node with said upper-level node that is directly adjacent to the node;

a physical cell identity PCI and a radio frequency channel number EARFCN-DL of said upper-level node that is directly adjacent to the node; and a count value parameter Uplink NAS COUNT in an uplink non-access stratum (NAS) message of said upper-level node that is directly adjacent to the node.

* * * * *